Aug. 29, 1933.   R. T. EDWARDS   1,924,845
SEALING TOOL
Original Filed July 3, 1929   3 Sheets-Sheet 2
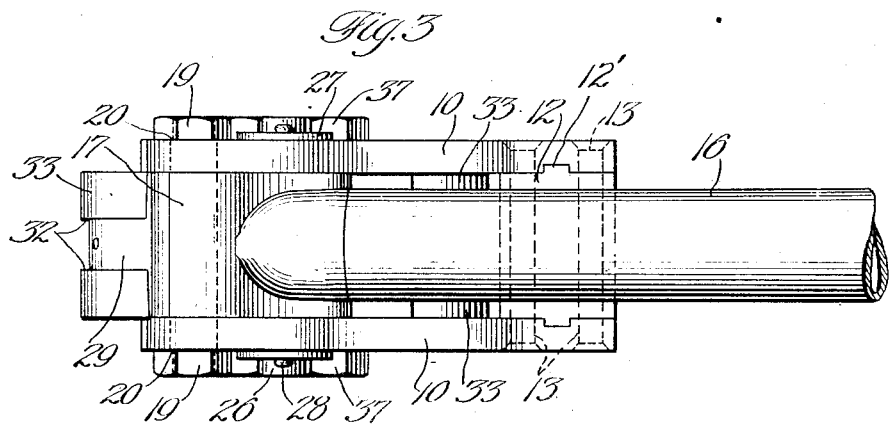
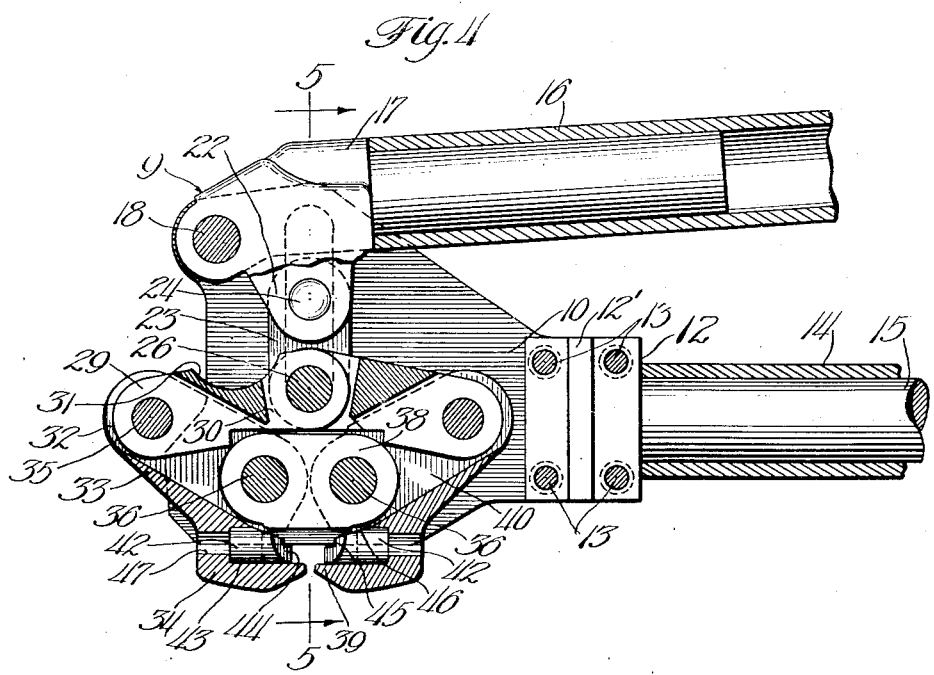
Inventor:
Russell T. Edwards
By Williams, Bradbury, McCaleb & Hinkle
Attys.

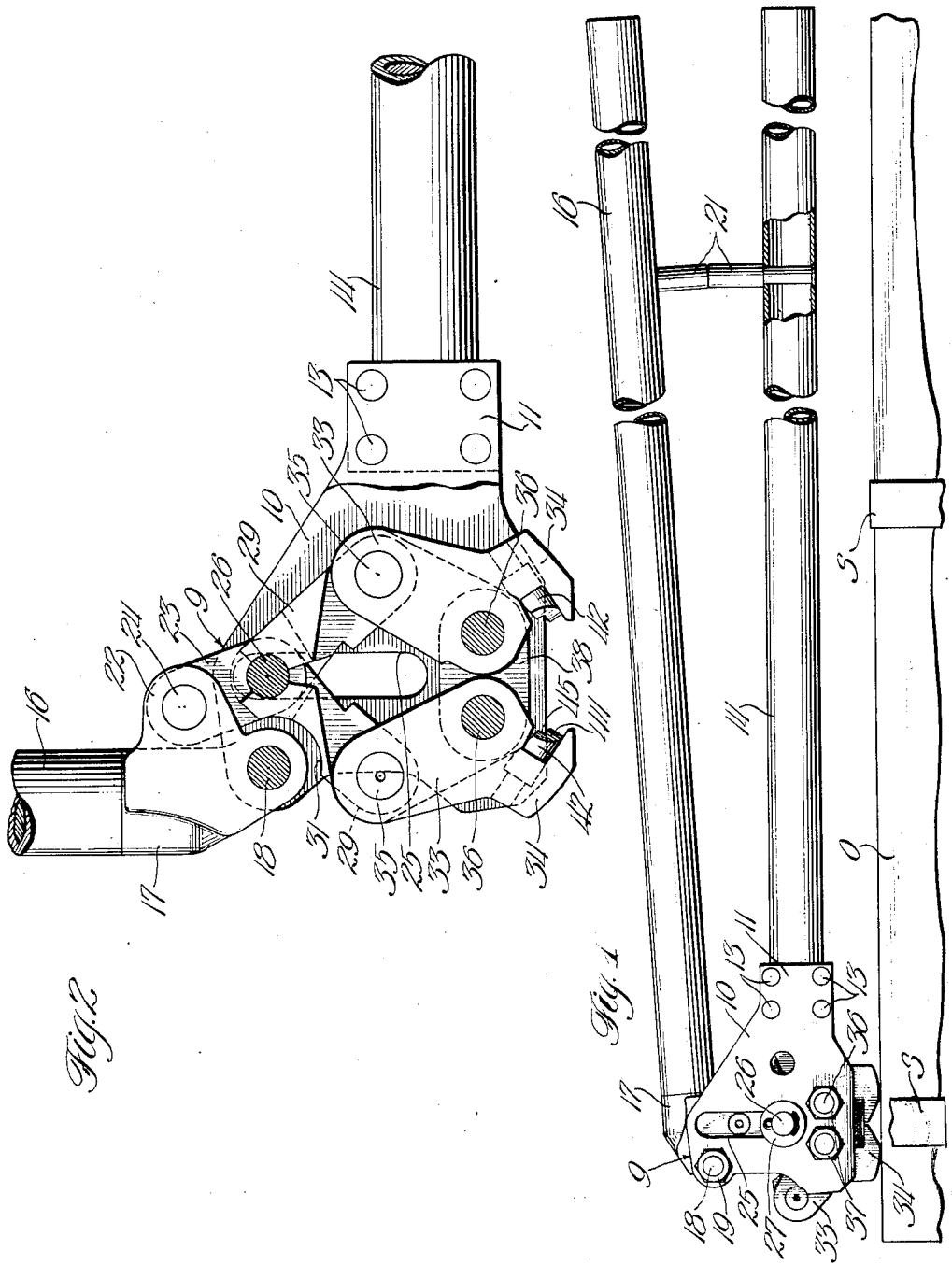

Aug. 29, 1933.  R. T. EDWARDS  1,924,845
SEALING TOOL
Original Filed July 3, 1929  3 Sheets-Sheet 3
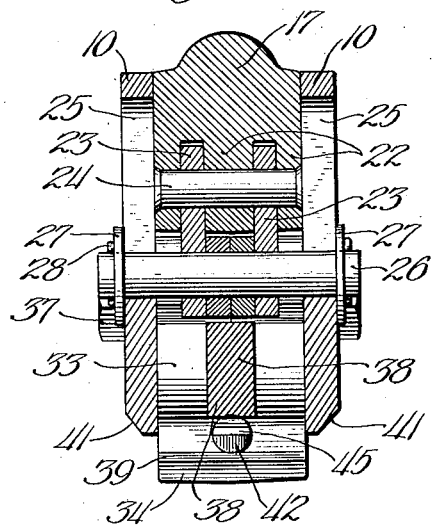
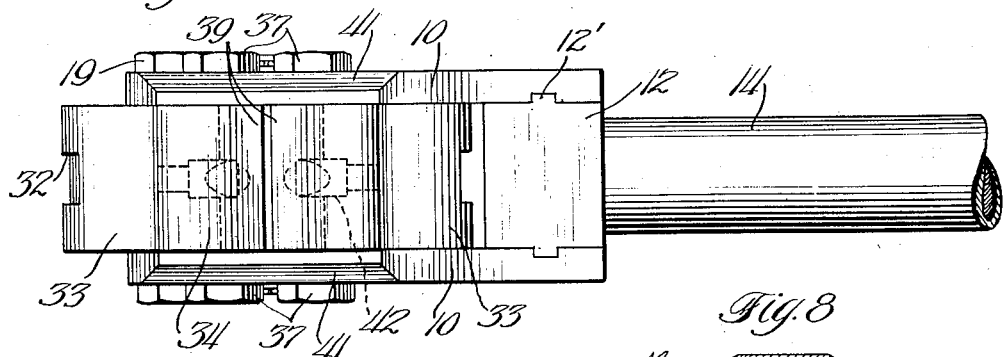
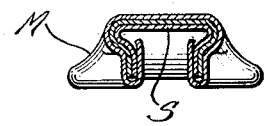
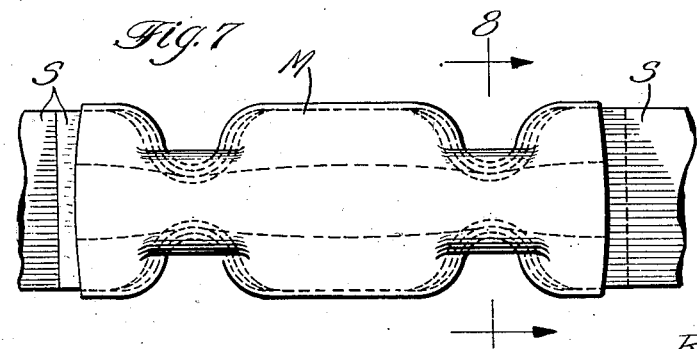
Inventor:
Russell T. Edwards
By Williams, Bradbury, McCaleb & Hinkle
Attys.

Patented Aug. 29, 1933

1,924,845

UNITED STATES PATENT OFFICE 1,924,845

SEALING TOOL

Russell T. Edwards, Chicago, Ill., assignor to Signode Steel Strapping Company, Chicago, Ill., a corporation of Delaware Application July 3, 1929, Serial No. 375,734
Renewed February 2, 1933

4 Claims. (Cl. 81—9.1)

This invention relates to sealing tools for use in forming seal joints to interlock the overlapped ends of steel band strapping used for binding objects of various sorts. For the purpose of illustrating the characteristics of the invention it will be shown and described as embodied in a tool particularly adapted to produce a sealed joint of the general type shown in the patents to E. E. Flora, No. 1,252,680, of January 8, 1918, or J. W. Leslie, No. 1,445,330, of February 13, 1923, although, of course, other types and forms of joints may be produced by modification of the jaws or deforming mechanism.

The primary object of the invention is to provide a sealing tool of the side action type such as illustrated in the application of M. C. Taylor, Serial No. 287,933, filed June 25, 1928, and in simplifying and rendering more economical the production of such tools whereby great power may be exerted with a minimum exertion of manual force in deforming the band ends for the purpose of producing seal joints of the character mentioned.

A further object of the invention is to provide a sealing tool of the type having a pair of handles, one of which is pivoted to a head having side plates between which the other handle is rigidly secured so as to constitute a stationary handle, while a pair of jaws are pivoted between the side plates of the head and provided with a novel form of toggle connection with the pivoted handle so that the jaws may be quickly brought to deforming position upon the work and retracted.

A still further object of the invention is to provide a tool in which the jaws are positioned at one side of the head and the toggle mechanism is so constructed that the connection with the pivoted handle is guided in its movements in slots in the side plates of the head, and also serves to limit the movements of the pivoted handle, and thus of the toggle mechanism, serving to operate the jaws, and thus the jaws actuated thereby.

Other objects and advantages of the invention will appear as the description proceeds.

An embodiment of the invention is illustrated in the accompanying drawings, in which:

Fig. 1 is a side elevation of the novel sealing tool partly broken away and in section and shown applied to an object to be bound with the jaws closed.

Fig. 2 is an enlarged fragmentary sectional elevation taken partly inside the plane of one side plate and with the handles and jaws in open position in contradistinction to the closed position shown in Fig. 1;

Fig. 3 is a plan view of the device in closed position;

Fig. 4 is a central longitudinal sectional view of the device with the jaws closed.

Fig. 5 is a transverse section taken on the line 5—5 of Fig. 4;

Fig. 6 is a bottom plan view of the structure shown in Fig. 4;

Fig. 7 is a top plan view of the seal joint produced by the tool; and

Fig. 8 is a sectional view taken on the line 8—8 of Fig. 7.

Referring to the drawings in detail, the sealing tool is shown as comprising a head, generally designated at 9, which includes two metal side plates 10 having extensions 11 between which a block 12, having opposite transverse ribs 12' engaging corresponding grooves in the side plates, is secured as by means of rivets 13, shown four in number, and thus constituting means for connecting the plates in spaced parallel relation. A stationary handle 14 is connected to the block 12 and may be reinforced by a shank 15. Another handle 16 is similarly connected to a block 17, pivoted at 18 between the side plates 10, the pivotal connection being preferably in the form of a bolt having its ends disposed through holes in the side plates and the terminals thereof provided with reduced portions which are threaded to take nuts 19. These reduced portions form shoulders 20 which the nuts abut, thus preventing the side plates from being forced too tightly together. Handles 14 and 16 are provided with pins 21 projecting toward each other at their inner sides to form stops adapted to abut against each other to limit the movement of the pivoted handle toward the stationary handle.

The handle 16 and the block 17 produce a lever which is pivoted between the side plates of the head as already described and the block 17 is provided with an arm 22 having a pair of bifurcations which are apertured to produce pivot ears. These ears or furcations receive a pair of links 23 pivotally connected to the arm by a pin 24 and the links project transversely of the head beneath opposed transverse slots 25 in the side plates. A pin 26 is extended through the lower ends of the links 23 and at its ends projects through the slots 25 in which said ends are adapted to have transverse sliding movement or reciprocation upon movement of the pivoted handle toward and away from the stationary handle. The ends of the pin 26 project beyond the outer surfaces of the side plates 10 and the pin is held from displacement in a suitable way as by means of washers 27 mounted on the ends of the pin in such a manner as to span the slots 25 and held as by means of cotter pins 28.

The pin 26 also serves as a pivotal connection for the inner ends of links 29 which are of peculiar construction, as indicated in the drawings. The inner ends of these links 29 are provided with a pair of bifurcations 30 staggered with reference to each other so that the ears or furcations thus produced interfit and are apertured to take the pin 26 and one bifurcation of each link is made sufficiently wide to accommodate the adjacent ends of the links 23. Also, the inner face of the outer link 29 is recessed as shown at 31 to accommodate the adjacent pivoted portion of the block 17 when the handle 16 is swung upwardly, as particularly shown in Fig. 2 of the drawings. The outer ends of the links 29 are reduced in thickness to form intermediate pivot ears which are accommodated in furcations at bifurcated ends 32 of arms 33 formed as angular extensions on a pair of jaws 34 and pivotally connected thereto as by means of pivot pins 35.

The jaws 34 are independently pivoted between the side plates, as indicated at 36, these pivots being spaced apart in parallel relation and preferably being in the form of bolts corresponding to the pivot bolt 18 and having reduced threaded ends engaged by nuts 37, thus serving as connecting means for the plates and limiting the extent to which the plates are forced together.

The bolts 36 also serve to mount a pressure block 38 which is disposed with its outer edge in spaced relation to the over-hanging lips 39 of the jaws 34, the pressure block being apertured at its ends to receive the bolts and being thereby held stationary and accommodated in bifurcations 40 at the angular portions of the jaws 34 which pivot upon the bolts 36 at each side of the pressure block 38. It will be noted that the jaws are located at one side of the head, that is the side edges of the plates 10, which may be suitably beveled as indicated at 41.

For the purpose of producing a seal joint of the character set forth in the Flora or Leslie patents previously mentioned, the deforming faces of the jaws 34 each have cylindrical deforming pins 42 partially received within bores 43 formed in the opposite faces of the jaws and axially aligned when the jaws are closed. Each of the pins has a curved, forwardly extending deforming surface 44 outwardly of the axis of the pin and immediately there-beneath is provided a cut-away portion or recess 45, while the inner surfaces of the pins are bevelled, as indicated at 46, providing the necessary clearance for receiving the band or strapping S mounted on the object O and arranged to encircle the same, as indicated in Fig. 1 of the drawings. Passages 47, axially aligned through the outer walls of the jaws, are provided to facilitate removal of the pins by introduction of a punch or similar tool therethrough, as may be necessary when the deforming pins become excessively worn or are broken.

In use, the sealing tool is placed over the object O to be bound by the band or strap S, any number of which may be used as found necessary. As this tool is a side action type of tool, the stationary handle 14 is placed down so that the jaws 34 are toward the object and, with the handle 16 raised to open the jaws as indicated in Fig. 2 to their full extent, the jaw lips are engaged under the band at their overlapping ends with or without the use of a sleeve M engaged thereon. With the parts so engaged, the handle 16 is then lowered or swung toward the stationary handle 14 until the jaws 34 and the deforming pins are brought together with great force against the opposite edges of the band and the sleeve used in conjunction therewith with the result that the parts of the band and sleeve thus confined will be deformed to produce a seal having the appearance shown in Figs. 7 and 8 of the drawings. Of course, only one deformation will be produced at each operation and this operation is continued according to the number of deformations to be produced, there being two shown in the joint disclosed in Fig. 7. The action of the toggle mechanism during the movements of the pivotal handle in opening and closing the jaws as above described, will now be related. Normally, the parts will be in the positions shown in Figs. 1 and 4 and when the pivotal handle 16 is raised as disclosed in Fig. 2, the block 17 will be swung upwardly together with its arm 22, thus raising the links 23. This draws upwardly on the inner ends of the links 29, thereby swinging the outer ends of the arms 33 inwardly, while the pin 26 will shift or slide to the opposite ends of the slots 25, thereby guiding the links in their movements and insuring uniform action of the deforming jaws. The jaws 34 will, therefore, be swung on their pivots 36 to separate the lips and deforming pins whereby the tool may be readily engaged over the overlapping band ends.

With the device so applied to the band ends with or without a sleeve as described, the pivoted handle 16 is then swung toward the stationary handle 14 limited in its movements by the stops 21. During this movement the arm 22 will swing downwardly, together with the links 23, and the pin 26 will be shifted to the opposite ends of the slots 25. The links 29 will, therefore, be brought from positions substantially at right angles to each other, or perhaps at an acute angle slightly less than a right angle, to spread positions at an obtuse angle relative to each other and substantially in alignment. By this means, the arms 33 of the pivoted jaws will be separated or swung outwardly, thereby moving the operative faces of the jaws toward each other upon the individual pivots 36 of the jaws. By reason of this toggle mechanism or connection between the pivoted lever and the jaws, the jaws may be quickly actuated to engage the work or to be retracted therefrom and great force may be applied in deforming the bands to produce the necessary seal joint with but a minimum exertion of manual force. The parts are so constructed that they are practically duplicates of each other with the exception of the links 29, one of which is provided with the recess 31 as heretofore described for accommodating the pivoted end of the handle or lever 16 when swung upwardly, as clearly disclosed in Fig. 2 of the drawings. The device is simple in construction, reliable in operation and effective in expeditiously producing the seal joints of the type specified.

The pin 26 engaging the opposite ends of the slots 25 in the side plates or other equivalent structure, will limit the opening and closing movements of the jaws and handles so as not to jam the jaws 34 against each other in closing (the lips 39 of the jaws being preferably slightly spaced apart at the limit of the closing movement as seen in Figs. 1 and 4) or permit unnecessary or excessive strains or stresses to be placed on the pivotal connections of the toggle mechanism between the handle and jaws. Moreover, the parts are so related as to centralize the work and equalize the pressure of both jaws against the work, due to the fact that the one operating handle is similarly connected to and operates both jaws which are thereby caused to move in unison or synchronism and to the same degree in both directions over the pressure block or chair 38. The device is so constructed that the pin 26 engages the forward ends of the slots 25 slightly before the stops or pins 21 abut, but either limiting means will prevent further movement of the jaws and toggle connections, and excessive strains thereon after the seal joint is completed.

While I have illustrated and described in detail a preferred embodiment of my invention, it is understood that I am not limited to the specific details shown except as defined by the following claims.

I claim:

1. A sealing tool for producing a seal joint between the overlapped ends of a strapping band, comprising a head having side plates, a stationary handle positioned between and connected to said side plates, a movable handle pivoted between said side plates and having an arm, said side plates having transverse slots, a pair of jaws individually pivoted between said plates, a pressure block stationarily held by said pivots and positioned parallel to the sides of the plates opposite the pivot of the movable handle, arms on said jaws, links pivoted to the arms, a pin connecting the links and projecting through the slots of the plates for sliding movement therein, and links pivotally connecting the pin with the arm of the movable handle.

2. A sealing tool for producing a seal joint between the overlapped ends of a strapping band, comprising a head having side plates, a stationary handle positioned between and connected to said side plates, a movable handle pivoted between said side plates and having an arm, said side plates having transverse slots, a pair of jaws individually pivoted between said plates, a pressure block stationarily held by said pivots and positioned parallel to the sides of the plates opposite the pivot of the movable handle, arms on said jaws, links pivoted to the arms, a pin connecting the links and projecting through the slots of the plates for sliding movement therein, links pivotally connecting the pin with the arm of the movable handle, said jaws having means for deforming the overlapped strap ends, the pin being limited in its movements at opposite ends of the slots, and means for limiting the movement of the movable handle toward the stationary handle.

3. A sealing tool for producing a seal joint between the overlapped ends of a strapping band, comprising a head including side plates, a stationary handle fixed to said head, a movable handle pivoted to said head, said side plates having straight transverse slots therethrough, a pair of jaws disposed between and individually pivoted to said plates, a pressure block stationarily fixed between said plates and disposed between said jaws at a point adjacent one end of the slots in said plates, an arm on said movable handle, adapted to project between said plates, angularly disposed arms on said jaws, links pivoted to each of said arms, a pin pivotally connecting all of said links and projecting through the slots in said plates to be guided thereby in its movement along a rectilinear path.

4. A sealing tool for producing a seal joint between the overlapped ends of a strapping band, comprising a head including side plates, a stationary handle fixed to said head, a movable handle pivoted to said head, said side plates having straight transverse slots therethrough, a pair of jaws disposed between and individually pivoted to said plates, a pressure block stationarily fixed between said plates and disposed between said jaws at a point adjacent one end of the slots in said plates, an arm on said movable handle, adapted to project between said plates, angularly disposed arms on said jaws, links pivoted to each of said arms, a pin pivotally connecting all of said links and projecting through the slots in said plates to be guided thereby in its movement along a rectilinear path, said jaws having means for deforming the overlapped strap ends, said pin being limited in its movements at opposite ends of the slots, and means for limiting the movement of the movable handle toward the stationary handle.

RUSSELL T. EDWARDS.